US010628641B2

(12) United States Patent
Knotts et al.

(10) Patent No.: US 10,628,641 B2
(45) Date of Patent: Apr. 21, 2020

(54) COMMUNICATION SOLUTIONS FOR SELF-DRIVING CAR SERVICES (71) Applicant: Cisco Technology, Inc., San Jose, CA (US)

(72) Inventors: Monica Shen Knotts, San Jose, CA (US); John George Apostolopoulos, Palo Alto, CA (US); Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/489,857

(22) Filed: Apr. 18, 2017

(65) Prior Publication Data
US 2018/0299895 A1  Oct. 18, 2018

(51) Int. Cl.
G05D 1/02 (2020.01)
G06K 7/10 (2006.01)
H04L 29/08 (2006.01)

(52) U.S. Cl.
CPC .......... *G06K 7/10297* (2013.01); *H04L 67/12* (2013.01); *G05D 2201/0212* (2013.01)

(58) Field of Classification Search
CPC .............................. G05D 1/028; G05D 1/0246
See application file for complete search history.

(56) References Cited

U.S. PATENT DOCUMENTS

| 8,606,430 | B2 | 12/2013 | Seder et al. |
| 9,440,660 | B2 | 9/2016 | Sherony et al. |
| 9,475,422 | B2 | 10/2016 | Hillis et al. |
| 9,836,717 | B2 * | 12/2017 | Van Wiemeersch ......... G06Q 10/087 |
| 2006/0244815 | A1 * | 11/2006 | Barreiro ............... H04N 7/15 348/14.07 |
| 2006/0266563 | A1 * | 11/2006 | Kaplan ................ G01G 19/58 177/245 |
| 2009/0192851 | A1 * | 7/2009 | Bishop .................. G06Q 10/08 705/26.3 |
| 2014/0168453 | A1 * | 6/2014 | Shoemake ......... H04N 5/23206 348/207.11 |

(Continued)

OTHER PUBLICATIONS

"Fun Vii Concept Car", Toyota, http://www.toyota.com/?msid=Lets_Go_Places_ToyotaLogo:Toyota_Hp, last accessed on Apr. 17, 2017, 2 pages.

(Continued)

*Primary Examiner* — Jess Whittington
(74) *Attorney, Agent, or Firm* — Edell, Shapiro & Finnan, LLC (57) ABSTRACT

Presented herein are techniques for matching a user, e.g., a child, with an autonomous vehicle instructed to pick up the child. In an embodiment, a method includes receiving, at a server, information from an autonomous vehicle, receiving, at the server, information from a user device, receiving, at the server, information from a responsible party device, processing, by the server, the information from the autonomous vehicle, the information from the user device, and the information from the responsible party device, and based on the processing of the information from the autonomous vehicle, the information from the user device, and the information from the responsible party device, verifying, by the server, that the autonomous vehicle is matched with a user of the user device.

17 Claims, 5 Drawing Sheets

(56) References Cited

U.S. PATENT DOCUMENTS

| | | | |
|---|---|---|---|
| 2015/0006005 A1 | 1/2015 | Yu et al. | |
| 2015/0019982 A1* | 1/2015 | Petitt, Jr. | H04W 4/029 715/738 |
| 2015/0271639 A1* | 9/2015 | Ziskind | H04W 4/021 455/456.1 |
| 2015/0339928 A1* | 11/2015 | Ramanujam | G08G 1/202 701/23 |
| 2016/0299602 A1* | 10/2016 | Shuster | G06F 3/016 |
| 2016/0301698 A1* | 10/2016 | Katara | G07B 13/02 |
| 2018/0121958 A1* | 5/2018 | Aist | G06Q 30/0261 |
| 2018/0164809 A1* | 6/2018 | Moosaei | G05D 1/0022 |
| 2018/0196417 A1* | 7/2018 | Iagnemma | G06Q 50/30 |

OTHER PUBLICATIONS

Chicago Tribune article, "Would you let a service drive your kids? Some parents already do", Aug. 7, 2015, http://www.chicagotribune.com/business/ct-back-to-school-uber-0807-biz-20150807-story.html, 5 pages.

Katie Roof, "HopSkipDrive wants to be the Uber for kids", TechCrunch, https://techcrunch.com/2016/08/26/hopskipdrive-wants-to-be-the-uber-for-kids/, downloaded from the internet on Apr. 26, 2019, 3 pages.

Dylan Martin, "Transportation for Children: Zemcar is Like Uber for Kids:", Feb. 10, 2016, http://bostinno.streetwise_co/all-series/transportation-for-children-zemcar-is-like-uber-for-kids/, 5 pages.

Greg Kumparak, "Shuddle, the Uber-like service for getting your kids around, is shutting down tomorrow", TechCrunch, downloaded from the internet on Apr. 26, 2019, https://techcrunch.com/2016/04/14/shuddle-the-uber-like-service-for-getting-your-kids-around-is-shutting-down-tomorrow/, 4 pages.

\* cited by examiner

COMMUNICATION SOLUTIONS FOR SELF-DRIVING CAR SERVICES

TECHNICAL FIELD

The present disclosure relates to interactions associated with a self-driving or autonomous vehicle.

BACKGROUND

Autonomous vehicles are starting to become a commercial reality. Such vehicles can provide several advantages. For example, without driver error, fewer vehicle crashes may result, traffic may flow more efficiently, and congestion might therefore decrease. Vehicle occupants, particularly former drivers, can spend travel time engaged in other activities. And, fuel efficiency can be increased due to improved driving practices.

In addition, the mobility of the young, the elderly, and the disabled could increase using autonomous vehicles. Specifically, transportation of people to and from events and appointments often consumes much of a parent or caregiver's time, and such transportation is sometimes not possible as a result of time constraints. Manned taxis and other manned paid transportation modes can be expensive. But, the advent of autonomous vehicles may provide cost relief and thereby provide a more economical way to address the transportation needs of certain people, including the young, elderly or disabled, especially if their special emotional, security, and safety needs can be met.

DESCRIPTION OF EXAMPLE EMBODIMENTS

Overview

Presented herein are techniques for matching a user, e.g., a child, with an autonomous vehicle instructed to pick up the child. In an embodiment, a method includes receiving, at a server, information from an autonomous vehicle, receiving, at the server, information from a user device, receiving, at the server, information from a responsible party device, processing, by the server, the information from the autonomous vehicle, the information from the user device, and the information from the responsible party device, and based on the processing of the information from the autonomous vehicle, the information from the user device, and the information from the responsible party device, verifying, by the server, that the autonomous vehicle is matched with a user of the user device.

Also presented herein is a device, including an interface unit configured to enable network communications, a memory, and one or more processors coupled to the interface unit and the memory, and configured to: receive information from an autonomous vehicle, receive information from a user device, receive information from a responsible party device, process the information from the autonomous vehicle, the information from the user device, and the information from the responsible party device, and based on a process result of the information from the autonomous vehicle, the information from the user device, and the information from the responsible party device, verify that the autonomous vehicle is matched with a user of the user device.

EXAMPLE EMBODIMENTS

Figure 1:
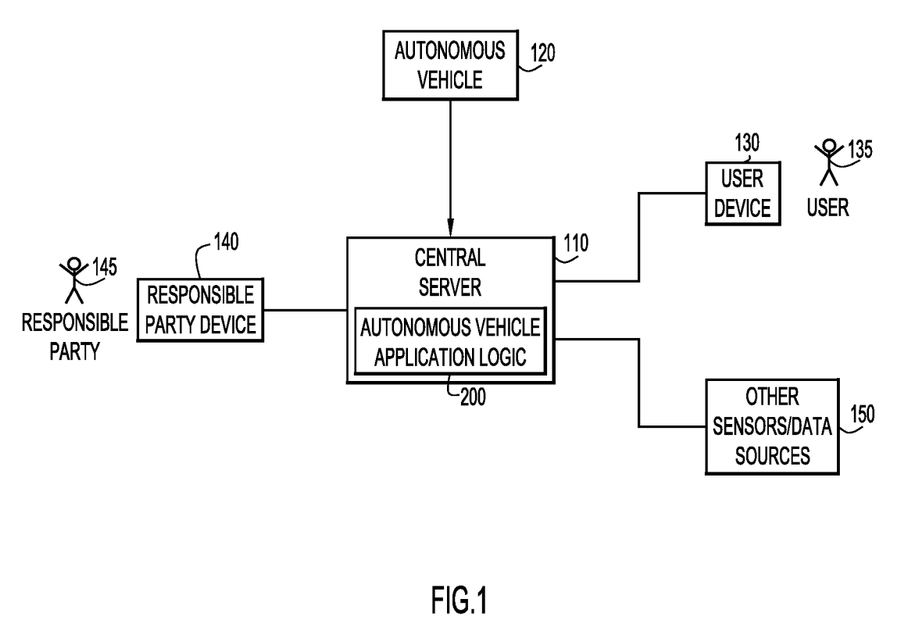
FIG. 1 depicts a network topology including a central server that hosts autonomous vehicle application logic, which communicates with multiple components in accordance with an example embodiment.

FIG. 1 depicts a network topology including a central server that hosts autonomous vehicle application logic, which communicates with multiple components in accordance with an example embodiment. More specifically, a central server 110 hosts autonomous vehicle application logic (or, simple, "application logic") 200. Central server 110 is also in communication with an autonomous vehicle 120, a user device 130 and an associated user 135, a "responsible party" device 140 and a responsible party 145, and other sensors/data sources 150.

Central server 110 is depicted as a single entity, but those skilled in the art will appreciate that central server 110 could be part of a centralized or distributed system, or data center, cloud computing or fog computing environment. An example hardware implementation for central server 110 is described later herein in connection with FIG. 5.

Autonomous (or self-driving) vehicle 120 may be any form of transportation vehicle such as a car, truck, bus, rotorcraft, helicopter, etc. Autonomous vehicle 120 may include a host of sensors to enable the vehicle to navigate over streets and through traffic. For example, autonomous vehicle 120 may include, although not expressly depicted in the figure, a processor and memory for storing a detailed map and traffic pattern model information. The processor may be in communication with a multitude of sensors (also not shown) such as lasers, cameras, radar, the vehicle's braking system, acceleration system, signaling system and navigation system, as well as a direction/speed detection device and geographic position component. Autonomous vehicle 120 may communicate with central server 110 via a vehicle-to-infrastructure (V2I) links including wireless communication infrastructure such as a cellular system or wireless local area network, for example.

A user 135 (such as a child) interacts with user device 130. User device 130 may be a smart phone, tablet, wearable computing device (e.g., augmented reality glasses or wristband), or any other electronic device that has a user interface that enables user 135 to interact with an application running on user device 130 and that is configured to communicate with central server 110 and application logic 200 hosted thereon. Communication between user device 130 and central server 110 may be implemented via a wireless communication infrastructure such as a cellular system or wireless local area network, for example.

A responsible party 145 (such as a parent or caregiver) interacts with responsible party device 140. Responsible party device 140 may be a smart phone, tablet, desktop computer, wearable computing device, personal assistant device, or any other electronic device that has a user interface that enables responsible party 145 to interact with an application running on responsible party device 140 and that is configured to communicate with central server 110 and communication logic 200 hosted thereon. As with user device 130, responsible party device 140 may communicate with central server 110 via a wired or wireless communication infrastructure such as a cellular system or wireless local area network, for example.

Other sensors/data sources 150 may include traffic sensors, a weather information feed, surveillance cameras, or any other external information source that may be of use to application logic 200, autonomous vehicle 120, user 135 or responsible party 145. Communication with other sensors/data sources may be wired or wireless.

As will be described more fully herein, a goal of the described embodiments is to facilitate a user 135 (e.g., child or elderly person) to identify and embark on the appropriate autonomous vehicle (without the immediate presence of the responsible party), and for the responsible party to gain confidence that the user 135 has in fact embarked on the correct autonomous vehicle 120. That is, a parent may be concerned about expecting a child to identify and enter the correct vehicle where there could be dozens of vehicles from which to choose (e.g., at after-school pick-up, or after an event with a large gathering of people). In the context of autonomous vehicles, a parent will often want assurance that the child is in the right car, going to the right destination, and further have the ability to check in with the child before and during transit to, e.g., help manage emotional needs of both parties.

In this regard, embodiments described herein include integrated communications (i.e., video/audio) in autonomous transportation that provide assurance desired by a payer (i.e., responsible party 145) to hire such services for the user 135.

In accordance with an embodiment, and at a high level, application logic 200 may be configured as a central repository for registration and identification information for each of the components in the overall topology depicted in FIG. 1. Thus, for example, application logic 200 may be configured to receive and store user and responsible party passwords, device identifiers, user and/or responsible party images, fingerprints, etc. Then, as the responsible party 145 uses the system to arrange for an autonomous vehicle pick-up of the user 135, application logic 200 can access the stored information and confirm or authenticate the user device 130/user 135 and responsible party device 140/responsible party 145 in real-time. Application logic 200 can also be configured to communicate with user device 130 to help the user (e.g., a child) identify which vehicle is the correct vehicle to embark on. Application logic 200 may also be configured to provide assurance that the user 135 (child) is in fact in the correct vehicle, and, finally, application logic 200 can be configured to facilitate communication between the user 135 and the responsible party 145, once user 135 is close to and/or embarked on the correct autonomous vehicle.

Figure 2:
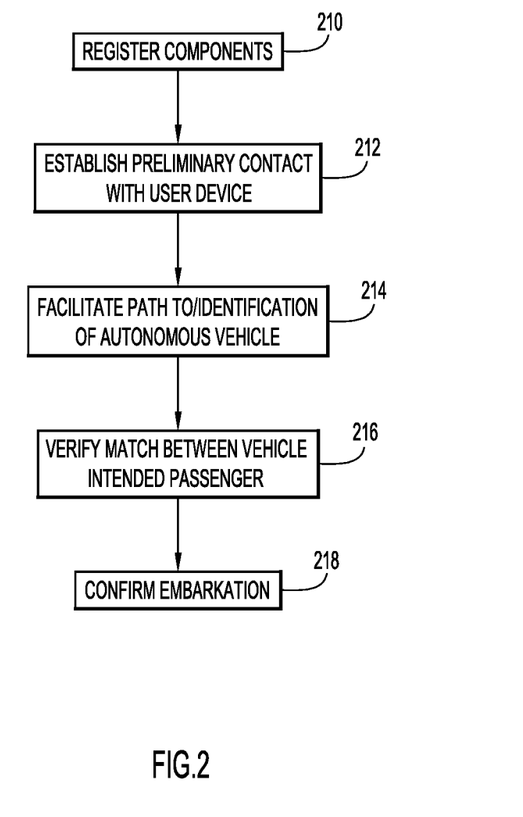
FIG. 2 is a flow chart depicting a series of operations that may be performed by the autonomous vehicle application logic in accordance with an example embodiment.

More specifically, FIG. 2 is a flow chart depicting a series of operations that may be performed by autonomous vehicle application logic 200 in accordance with an example embodiment. These operations need not necessarily occur in one continuous period, but may be performed over time and in discontinuous periods of time. At 210, application logic 200 registers components, users, etc. For example, application logic may register user 135 and responsible party 145, and their respective devices 130, 140, passwords, identify information, an image of user 135, phone numbers, RFID tags, IP addresses, network identifier, etc. Application logic 200 may also register an autonomous vehicle or a service that manages autonomous vehicle 120, and any passwords or other authentication information that might be relevant thereto. Application logic 200 might also store information used to establish a communication pathway with other sensors/data sources 150 to obtain yet additional information that might inform how a given trip in autonomous vehicle 120 might be planned or changed from an original plan.

Consider a child user 135 who leaves school and is searching for the correct autonomous vehicle 120 for pickup. At 212, application logic 200 may be configured to establish preliminary contact with user device 130 and therefore user 135. For example, application logic 200 might, through a user interface on an application running on user device 130, cause a message to be presented (graphically, textually, or audibly) that a car is waiting.

At 214, application logic 200, with the help of GPS operating on user device 130 and autonomous vehicle 120, might generate a path to autonomous vehicle 120 and graphically present the same on user device 130. Application logic 200, perhaps simultaneously, might also facilitate identification of the autonomous vehicle 120 by causing the vehicle to flash its lights, display an image on a part of the vehicle, or provide some sort of audible notification to user 135.

At 216, with the use of, e.g., cameras, microphones, RFID/Bluetooth tags, authentication information, etc., application logic 200 may be configured to verify a match between autonomous vehicle 120 and the intended passenger, namely user 135. Responsible party 145, for example, may be able, via application logic 200, to view the scene around autonomous vehicle 120 and even talk with user 135 using, e.g., at least one speaker, display, microphone and camera mounted on autonomous vehicle 120. Assuming a match is verified, autonomous vehicle 120 may activate its entry door to admit user 135.

At 218, application logic 200 may be configured to confirm that user 135 has indeed embarked on autonomous vehicle 120 using, e.g., internal cameras or weight sensors. This operation may also help to establish a communication session between audio/visual devices within autonomous vehicle 120 and responsible party device 140. Application logic 200 may also be used to provide final instructions to autonomous vehicle 120 regarding the destination to which user 135 should be taken.

Figure 3:
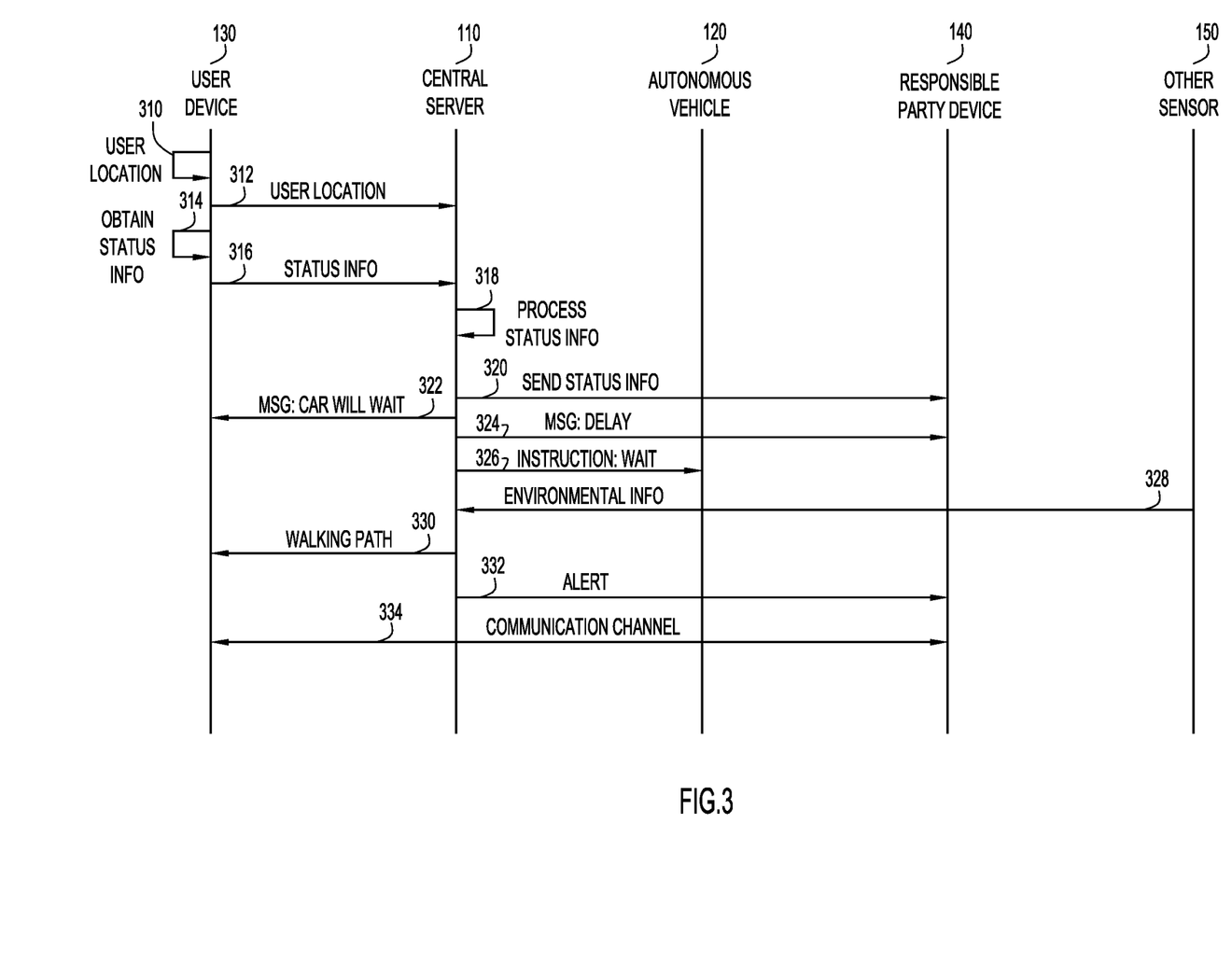
FIG. 3 depicts a ladder diagram of interactions among several components described herein in accordance with an example embodiment.

Reference is now made to FIG. 3 which depicts a ladder diagram of interactions among several components described herein in accordance with an example embodiment. The ladder diagram will be described in connection with a use scenario in which a child (user 135) is to be picked up after school by autonomous vehicle 120, but of course similar ladder logic would apply to other scenarios.

In this scenario, user 135 exits school and takes out user device 130. At 310, user device 130 determines the user device location using, e.g., GPS, or any other form of locating system. At 312, user location information is sent to central server 110 (and application logic 200). At 314, user device 130, on its own or in connection with application logic 200, solicits status information from user 135. For example, through a user interface on user device 130, the user 135 might be asked how their day was with simple to indicate feedback tap-enabled icons such as: "Good!," "OK" or "Not so good." Similarly, other selectable icons might indicate status of user 135 of "Feeling sick," "Need to use restroom," "Need to talk to mom/dad," or "Need help with school question." At 316, this status information is sent to central server 110.

At 318, central server 110 (i.e., application logic 200) processes the received status information. For example, based on the user status, central server 110, at 320, may send the status information to responsible party device 140. If the status information indicated that the user 135 selected the "need to use restroom" icon, central system may, at 322, send a message to user device 130 encouraging user 135 to go and reassure user 135 that the car will wait. At substantially the same time, central server 110 may, at 324, send a message to responsible party device 140 that there is a slight delay, and likewise, at 326, send an instruction to autonomous vehicle 120 to wait.

If, for example, user 135 selected an icon such as "feel sick" or "need to talk to my mom," central server 110 can send an alert/message to responsible party device 140, and further instruct the child to wait in a safe place until the issue is resolved at which time user 135 can be instructed to seek out autonomous vehicle 120.

After either a preset time allocation, a go-ahead message received from responsible party device 140, or the child returns from the restroom, central server 110, at 328 may retrieve selected data from other sensors 150. The selected data, or "environmental information," may include, for example, local weather, neighborhood traffic report for traffic congestion or road closures, school pedestrian safety report for pickup queue length, local smart road sensors for traffic speed on surrounding roads, smart sensors for crossing guard location and status, etc. This environmental information may be used to help safely guide user 135 towards autonomous vehicle 120 and provide useful feedback to responsible party device about a possible delay, for example.

In an embodiment, and at 330, central server 110 sends to user device 130, a map of a walking path toward the pick-up location for autonomous vehicle 120, including, e.g., color coded areas that show safe paths and virtual fences for "keep out" areas. These "keep out areas" may be superimposed on augmented reality imagery presented to user 135 on user device 130. As user 135 follows the path, and again using GPS or other locating service, if user 135 crosses a virtual fence as displayed on user device 130 (e.g., smart phone or augmented reality glasses), the device may buzz or sound an audible alert, or central server 110 might send an alert to a nearby crossing guard, or, at 332, send an alert to responsible party 140.

At 334, a communications channel might be opened between responsible party device 140 and user device 130, via central server 110, or at least triggered thereby. The communication channel may be audio and/or video. Operation 334, and all the operations indicated in FIG. 3 may be performed out of sequence, and in an overlapping manner.

In one possible implementation, video from user device 130 may pass through central server 110 to reach responsible party device 140. Similarly, video from autonomous vehicle 120 (e.g., an external camera) may pass through central server 110 to reach responsible party device 140. In an embodiment, application logic 200 executing on central server 110 may analyze the video(s) that it receives from autonomous vehicle 120, run person/face recognition algorithms to identify when user 135 comes into view (based on an image obtained during registration), and start sending video to responsible party device 140 with user 135 highlighted as soon as the child is identified in view. Central server 110 may maintain a database with pictures of user 135, a manifest of what user 135 may be carrying, as well as images of user 135 from an earlier trip that captures, e.g., images of clothes worn by user 135. Such information, especially the clothes and face information, can greatly improve the detection of user 135 in video in challenging situations, e.g., while user 135 is still far away and only a side profile of user 135 may be visible. Appropriate privacy precautions may be taken on central server 110, autonomous vehicle 120, user device 130, responsible party device 140, and other sensors 150 to ensure private images are secure.

In accordance with an embodiment, central server 110 may continuously monitor the location of user device 130 until arrival at autonomous vehicle 120. And, application logic 200 executing on central server 110 may also continuously retrieve environmental information and accordingly update the map and any walking instructions being presented via user device 130, since the virtual fences are highly dynamic based on, e.g., crosswalk signs being on or off, a crossing guard being in a particular location, and approaching vehicles.

In yet another possible implementation, since central server 110 "knows" the future path to be taken by user 135 in light of the walking path that is generated and supplied to user device 130, central server 110 may share that path, or at least parameters thereof, with smart highways and smart (autonomous, semi-autonomous) vehicles that use them, so that vehicle processors can learn about an approaching person (user 135), and from what direction that person may be approaching, and thereby achieve a higher level of safety. For example, if user 135 were to cross a virtual fence, brakes can be automatically applied to all vehicles in the area. This communication may be performed with vehicle-to-vehicle communication, or infrastructure-to-vehicle communication, or vehicle-to-infrastructure-to-vehicle communication using, e.g., Dedicated Short-Range Communication (DSR), cellular technology such as 4G LTE or emerging 5G with 5G NR or millimeter wave technologies, or other related technologies.

Figure 4:
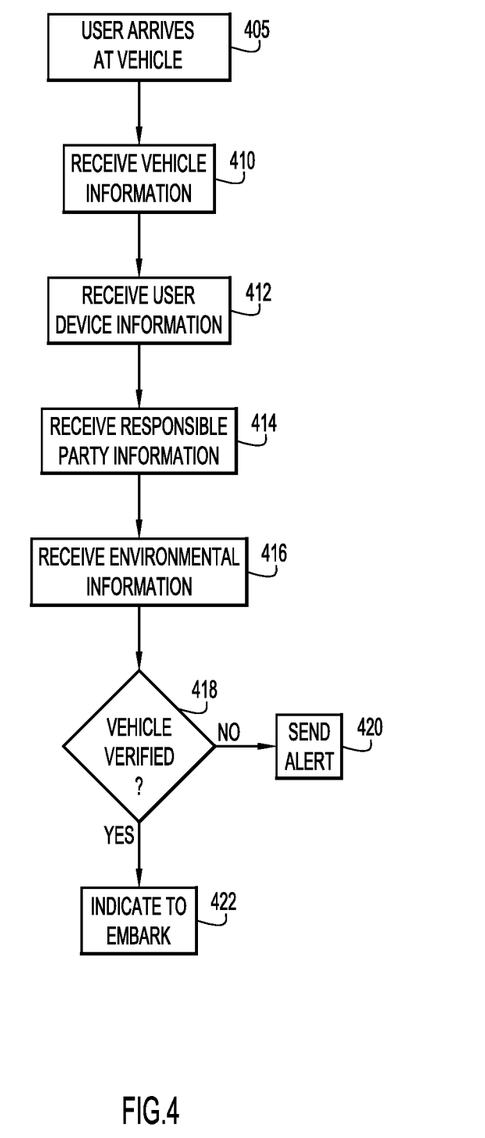
FIG. 4 is a flow chart depicting a series of operations that may be performed by autonomous vehicle application logic in accordance with an example embodiment.

Once user 135 arrives at autonomous vehicle 120 (or autonomous vehicle arrives at user 135), embodiments described herein may provide formal verification to ensure that user 135 is indeed about to embark on the correct vehicle. In this regard, FIG. 4 is a flow chart depicting a series of operations that may be performed by autonomous vehicle application logic 200 in accordance with an example embodiment.

At 405, user 135 arrives at autonomous vehicle 120. At 410, central server 110 receives from autonomous vehicle 120 data including, e.g., vehicle identification number (VIN), ride ID number, autonomous vehicle's GPS position, external camera images, among other possible metrics.

At 412, central server 110 also receives position of user device 130/user 135, photo image from user device's back camera towards autonomous vehicle 120, the control state of user device's user interface, and bi-directional audio and video.

At 414, central server 110 receives from responsible party device 140 instructions, authentication code/password/fingerprint/RFID, device ID for user device 130, and bi-directional audio and video At 416, central server 110, receives infrastructure or environmental information such as schoolyard camera images, smart highway sensor data, smart highway actuator/signal states, images and telemetry from nearby smart vehicles and other infrastructure. That is, venues where autonomous vehicle pickup may be prevalent may have infrastructure designed with additional sensors and other capabilities to facilitate more accurate and quicker matching between autonomous vehicle 120 and user 135. For example, such venues may includes schools, hospitals, stadiums, airports, train stations, bus stations, etc. These venues may be enhanced with features to explicitly facilitate the secure matching for autonomous vehicle 120 and user 135. For example, additional venue sensors such as video cameras and IR cameras may be provided to better isolate people and cars from clutter and billboard signs, etc. Parking places and people waiting places may be designed to facilitate waiting, matching, loading, and quick departure, where sensing is also specifically designed and deployed to provide the desired views, etc., to facilitate secure matching and to alert of any warnings (e.g., a child begins to walk away). A venue can also be enhanced by providing places where a user can "check in" and wait comfortably (with, e.g., internet access). Check-in may be via an NFC or fingerprint or visual recognition (face recognition) or sound (speech) communication. Wireless communication networks designed to facilitate communication between the relevant parties (e.g., user 135, responsible parent 145, autonomous vehicle 120, central server 110), using, for example, cellular, DSRC, wireless local area network, etc, may also be deploy at the venues. The venues may still further be outfitted with secure systems which have been certified to securely help identify and perform matching between people and their cars. This includes secure telemetry between the venue's infrastructure and both the vehicle and the user.

In one possible embodiment, described more fully below, interactive video of responsible party 145 may be displayed on, e.g., a window of autonomous vehicle 130 for the user 135 to see.

The foregoing information is then processed by application logic 200 executing on central server 110 to determine whether user 135 is at the correct vehicle, i.e., is, at 418, the vehicle verified for this user? This verification operation may be based on any number of multiple factors from multiple entities (i.e., user device, user, responsible party, responsible party device, autonomous vehicle, and environment, including the venue at which a pick up is being performed). For example, application logic 200 might confirm that the responsible party (previously) provided a correct access code for the autonomous vehicle. Application logic 200 might verify that responsible party 145 has confirmed visual identification of the user 135 through a camera mounted on autonomous vehicle 120. Application logic 200 might further determine whether the result of vehicle scan of the user's device (or RFID fob) matches information previously provided by the responsible party. Application logic 200 might verify that, in an embodiment where video of a responsible party is displayed on autonomous vehicle 120, user 135 has confirmed that it is the responsible party being shown. Application logic 200 might still further determine whether the VIN of autonomous vehicle 120 matches a VIN associated with an account belonging to responsible party 145. As a specific example, verifying that user 135 and autonomous vehicle 120 match might be based on location of the user device and identifier of the user device, identifier of the responsible party device and ride identifier from the responsible party device, and location of the autonomous vehicle and identifier of the autonomous vehicle. Cameras on autonomous vehicle 120, and at the venue, could scan the area immediately surrounding the vehicle to ensure that no unauthorized parties that may try to enter the vehicle are in the area. Cameras on other nearby autonomous vehicles or other sensors 150 could monitor the embarkation of user 135 from multiple angles. Autonomous vehicle 120 side screens can display a special image (i.e., an encrypted QR code) generated by application 200, can captured by the back camera on user device 130, sent back to application 200, and verified to ensure a non-hackable match between user 135 and vehicle 120. Voice authentication using a microphone on vehicle 120 could match a password or pass phrase or detect a unique voice print for user 135. A near field communication (NFC) between vehicle 120 and user 135 can be used to verify the match, e.g., user 135 can bring his/her portable device or wearable device in close proximity to or touching vehicle 120 and then an NFC verification can be performed. Note that while some NFC technologies enable verification as long as one is in close proximity (some number of inches), for improved security NFC techniques which require actual contact may be used to ensure to that user 135 has contacted the correct vehicle 120.

If, at 418, one or more of the foregoing verifications fail, then at 420 an alert is sent to user device 130 and, perhaps also, responsible party device 140 and appropriate authorities near autonomous vehicle 120 to ensure that user 135 does not embark on the wrong vehicle, and no extra persons embark vehicle 120 with user 135 without authorization.

If the verifications are successful, then, at 422, user device 130 may indicate to user 135 to embark on vehicle. This could involve unlocking and/or opening power operated doors. Responsible party 145 might also provide an indication directly to user device 130 (via central server 110) that it is permissible to embark.

Once user 135 embarks, several pre-departure operations may be performed such as scanning for missing items, making sure that the user's inventory matches an expected list (compared to, e.g., a list generated from an earlier trip in the day), verifying a seat belt is buckled, etc. More specifically, using external cameras or weight sensors on autonomous vehicle 120, it is possible to check whether user 135 has left anything behind on the curb, such as a backpack or ball or lunchbox. Application logic 200 may use video analysis algorithms to examine the place where user 135 was waiting and set an audible alert for user 135 or audio/visual alert for responsible party device 140. Autonomous vehicle 120 may be configured to not depart until the potential missing bag was resolved or overridden, e.g., via an indication received from responsible party device 140.

In connection with ensuring a seat belt is properly fastened, application logic 200 may check a sensor that the belt has been fastened for the seat on which a weight of user 135 is detected. A camera internal to autonomous vehicle 120 (with, possibly, images streamed to responsible party device 140) may provide still further assurance that the belt has been fastened properly. An indication from responsible party device 140 received via central server 110 may provide final approval for departure.

Once any of the foregoing checks are made, approval from responsible party device 140 is received, and/or central server provides an appropriate instruction, autonomous vehicle 120 may depart for its intended destination.

Upon arrival at its destination, and user 135 disembarking, internal and external cameras on/in autonomous vehicle 120 can be used to determine whether user 135 has left anything behind in autonomous vehicle 120. Backpack, jacket, and other belongings could also be tagged with an RFID tag, and autonomous vehicle 120 could sound an alert if something is left behind. Alternatively, autonomous vehicle 120 could use weight sensors to note if the passenger compartment is heavier than it should be when empty.

Further Assistance in Identifying Correct Autonomous Vehicle.

As mentioned, children may not be able to identify which car is their ride, since the hired transportation does not resemble a familiar (e.g., family) car, and can dramatically change for each ride. At the same time, parents want to be certain that their children are entering the correct vehicle, provide their child assurance and have a brief conversation to check in.

Even if a child has a mobile phone, the parent cannot necessarily count on being able to contact him/her on it. For example, the child may forget to bring the phone, have it out of sight, keep it charged, or to turn the ringer back on, since many schools expect phones to be kept silent and out of sight during class hours. In addition, the child may not answer the phone if agitated.

In one possible implementation, cameras with wide angle lenses (e.g., like those employed to perform side collision avoidance for the vehicle) are deployed on both sides of the exterior of autonomous vehicle 120 to monitor for user 135 to approach. Displays may be mounted on windows, and ruggedized microphones and speakers may be mounted on the exterior of autonomous vehicle 120 near the displays. Displays can be organic light emitting diode (OLED) technology backed with polarizers that can block light coming from the back, which, when the OLEDs are off and the polarizers are off the displays are optically transparent and act as regular windows, and when they are on the user outside the vehicle can see a display in the window. Or, the displays can be standard LCD displays or OLED desplays that can roll down into the door similar to a second inner window, i.e., the display can roll up when the display is needed and rolled down and hidden when not needed.

In this embodiment, as autonomous vehicle 120 arrives, responsible party 145 establishes a communications link with autonomous vehicle 120, e.g., via central server 110. As user 135 approaches autonomous vehicle 120, responsible party 145 appears on the video screen, assuring user 135 that this is the correct vehicle. That is, a video conference of sorts can be established between user device 130 and responsible party device 140 via central server 110, enabling responsible party 145 to reassure user 135 that the autonomous vehicle 120, which is displaying the responsible party 145 is the correct vehicle on which to embark.

Figure 5:
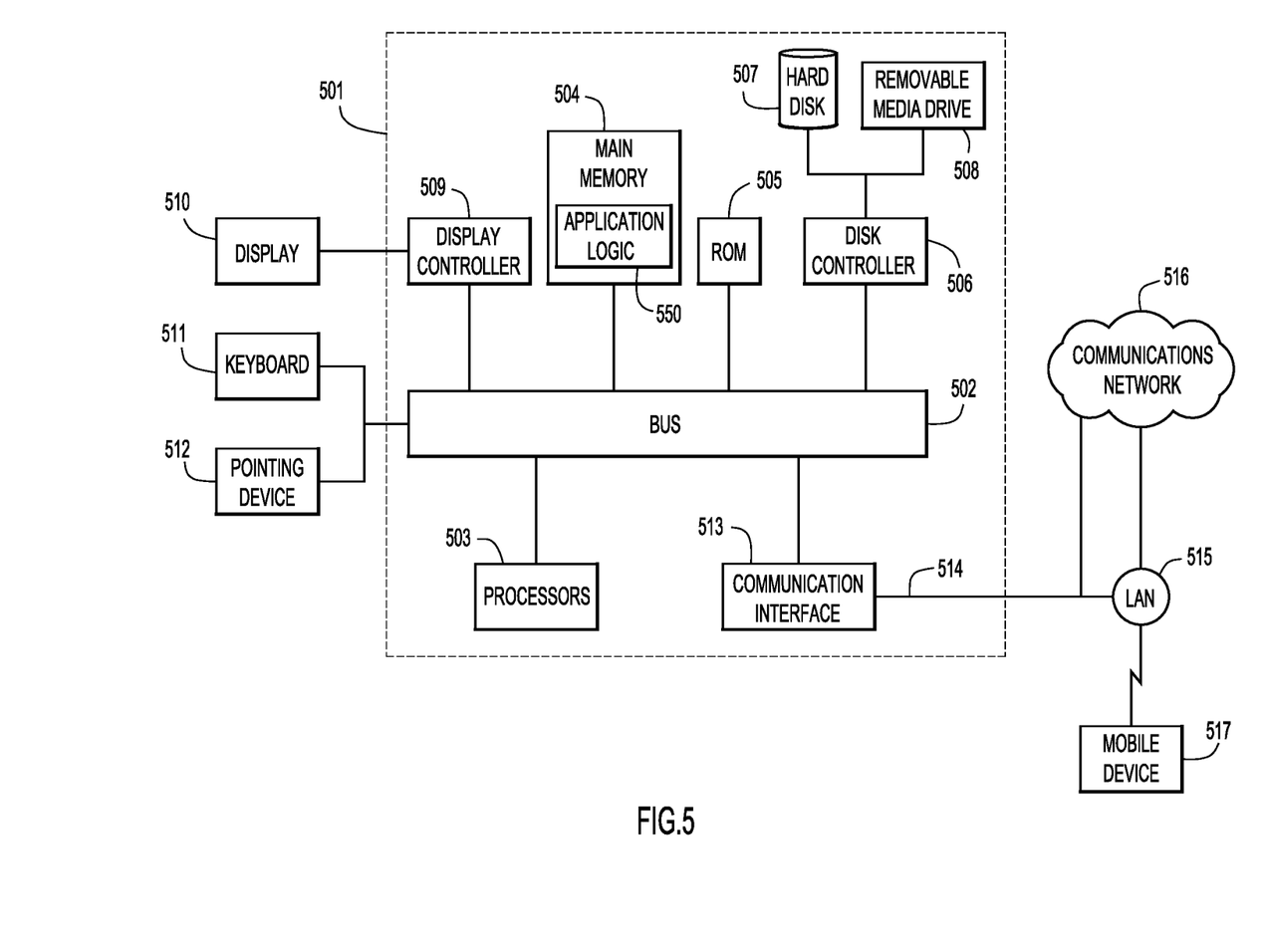
FIG. 5 depicts a device on which aspects of the several described embodiments may be implemented.

FIG. 5 depicts a device (e.g., central server 110) on which aspects of the several described embodiments may be implemented.

The apparatus may be implemented on or as a computer system 501. The computer system 501 may be programmed to implement a computer based device. The computer system 501 includes a bus 502 or other communication mechanism for communicating information, and a processor 503 coupled with the bus 502 for processing the information. While the figure shows a single block 503 for a processor, it should be understood that the processor 503 represents a plurality of processors or processing cores, each of which can perform separate processing. The computer system 501 may also include a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions (e.g., the logic to perform the operations of FIGS. 2-4 described throughout and indicated as application logic 550) to be executed by processor 503. In addition, the main memory 504 may be used for storing temporary variables or other intermediate information during the execution of instructions by the processor 503.

The computer system 501 may further include a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 may also include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, flash drive, USB drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors, graphics processing units, and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT), liquid crystal display (LCD), light emitting diode (LED) display, etc., for displaying information to a computer user. The computer system 501 may include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing operations of the embodiments described herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), USB drives, or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516. For example, the communication interface 513 may be a wired or wireless network interface card or modem (e.g., with SIM card) configured to attach to any packet switched (wired or wireless) LAN or WWAN. As another example, the communication interface 513 may be an asymmetrical digital subscriber line (ADSL) card, an integrated services digital network (ISDN) card, or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through the communications network 516. The network link 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613.

In summary, in one form, a method is provided. The method receiving, at a server, information from an autonomous vehicle, receiving, at the server, information from a user device, receiving, at the server, information from a responsible party device, processing, by the server, the information from the autonomous vehicle, the information from the user device, and the information from the responsible party device, and based on the processing of the information from the autonomous vehicle, the information from the user device, and the information from the responsible party device, verifying, by the server, that the autonomous vehicle is matched with a user of the user device.

The information from the autonomous vehicle may include at least one of a vehicle identification number (VIN), a ride identification number, a location of the autonomous vehicle, or external camera images.

The information from the user device may include at least one of a photo image from the user device, a Radio Frequency ID (RFID) tag identifier, or a control state of an application running on the user device.

The information from the responsible party device may include at least one of instructions for the autonomous vehicle, the user device, or the user of the user device, an authentication code, a password, or a device identifier for the user device.

The method may further include receiving environmental information including at least one of a camera image from a surveillance camera, a camera image from another autonomous vehicle, telemetry from another autonomous vehicle, a smart highway sensor value, or a smart highway actuator or signal state.

The method may still further include generating and causing to be displayed on the user device a map showing a path between a location of the user and a location of the autonomous vehicle.

The method may also include establishing a communication session between audio-visual equipment mounted on the autonomous vehicle and the responsible party device via the server.

In one implementation, the operation of verifying includes comparing multiple factors from each of the user device, the responsible party device, and the autonomous vehicle. The multiple factors may include location of the user device and identifier of the user device, identifier of the responsible party device and ride identifier from the responsible party device, and location of the autonomous vehicle and identifier of the autonomous vehicle.

The method may also include displaying an image, of a responsible party using the responsible party device, on the autonomous vehicle for a user of the user device to view.

In another embodiment, a device is provided. The device includes an interface unit configured to enable network communications, a memory, and one or more processors coupled to the interface unit and the memory, and configured to: receive information from an autonomous vehicle, receive information from a user device, receive information from a responsible party device, process the information from the autonomous vehicle, the information from the user device, and the information from the responsible party device, and based on a process result of the information from the autonomous vehicle, the information from the user device, and the information from the responsible party device, verify that the autonomous vehicle is matched with a user of the user device.

The information from the autonomous vehicle may include at least one of a vehicle identification number (VIN), a ride identification number, a location of the autonomous vehicle, or external camera images.

The information from the user device may include at least one of a photo image from the user device, a Radio Frequency ID (RFID) tag identifier, or a control state of an application running on the user device.

The information from the responsible party device may include at least one of instructions for the autonomous vehicle, the user device, or the user of the user device, an authentication code, a password, or a device identifier for the user device.

In an embodiment, the one or more processors may be configured to receive environmental information including at least one of a camera image from a surveillance camera, a camera image from another autonomous vehicle, telemetry from another autonomous vehicle, a smart highway sensor value, or a smart highway actuator or signal state.

The one or more processors may be configured to generate and cause to be displayed on the user device a map showing a path between a location of the user and a location of the autonomous vehicle.

The one or more processors may be configured to verify by comparing multiple factors from each of the user device, the responsible party device, and the autonomous vehicle.

In still another embodiment, a non-transitory tangible computer readable storage media encoded with instructions is provided that, when executed by at least one processor is configured to receive information from an autonomous vehicle, receive information from a user device, receive information from a responsible party device, process the information from the autonomous vehicle, the information from the user device, and the information from the responsible party device, and based on a process result of the information from the autonomous vehicle, the information from the user device, and the information from the responsible party device, verify that the autonomous vehicle is matched with a user of the user device.

The instructions may be further configured to cause the processor to generate and cause to be displayed on the user device a map showing a path between a location of the user and a location of the autonomous vehicle.

The instructions may be further configured to cause the processor to verify by comparing multiple factors from each of the user device, the responsible party device, and the autonomous vehicle.

The above description is intended by way of example only. Various modifications and structural changes may be made therein without departing from the scope of the concepts described herein and within the scope and range of equivalents of the claims.

What is claimed is:

1. A method comprising:
    receiving, at a server, information from an autonomous vehicle;
    receiving, at the server, information from a user device;
    receiving, at the server, information from a responsible party device, which is different from the user device;
    processing, by the server, the information from the autonomous vehicle, the information from the user device, and the information from the responsible party device;
    based on the processing of the information from the autonomous vehicle, the information from the user device, and the information from the responsible party device, verifying, by the server, that the autonomous vehicle is matched with a user of the user device, wherein the user of the user device is an intended passenger for the autonomous vehicle;
    using an external camera on the autonomous vehicle, and upon the user embarking on the autonomous vehicle, detecting whether an item belonging to the user is present where the user was waiting for the autonomous vehicle;
    causing an alert to be raised with respect to the item belonging to the user; and
    keeping the autonomous vehicle from departing until the alert has been resolved.

2. The method of claim 1, wherein the information from the autonomous vehicle comprises at least one of a vehicle identification number (VIN), a ride identification number, a location of the autonomous vehicle, an external camera image, near field communication (NFC) data, or radio frequency ID (RFID).

3. The method of claim 1, wherein the information from the user device comprises at least one of a photo image from the user device, a Radio Frequency ID (RFID) tag identifier, or a control state of an application running on the user device.

4. The method of claim 1, wherein the information from the responsible party device comprises at least one of instructions for the autonomous vehicle, the user device, or the user of the user device, an authentication code, a password, or a device identifier for the user device.

5. The method of claim 1, further comprising receiving environmental information comprising at least one of a camera image from a surveillance camera, data from a venue at which the autonomous vehicle is to pick up the user, a camera image from another autonomous vehicle, telemetry from another autonomous vehicle, a smart highway sensor value, or a smart highway actuator or signal state.

6. The method of claim 1, further comprising establishing a communication session between audio-visual equipment mounted on the autonomous vehicle and the responsible party device via the server.

7. The method of claim 1, wherein verifying comprises processing multiple factors from each of the user device, the responsible party device, and the autonomous vehicle.

8. The method of claim 7, wherein the multiple factors comprise location of the user device and identifier of the user device, identifier of the responsible party device and ride identifier from the responsible party device, and location of the autonomous vehicle and identifier of the autonomous vehicle.

9. The method of claim 1, further comprising displaying an image, of a responsible party using the responsible party device, on the autonomous vehicle for the user of the user device to view.

10. A device comprising:
    an interface unit configured to enable network communications;
    a memory; and
    one or more processors coupled to the interface unit and the memory, and configured to:
        receive information from an autonomous vehicle;
        receive information from a user device;
        receive information from a responsible party device, which is different from the user device;
        process the information from the autonomous vehicle, the information from the user device, and the information from the responsible party device;
        based on a process result of the information from the autonomous vehicle, the information from the user device, and the information from the responsible party device, verify that the autonomous vehicle is matched with a user of the user device, wherein the user of the user device is an intended passenger for the autonomous vehicle;

using an external camera on the autonomous vehicle, and upon the user embarking on the autonomous vehicle, detect whether an item belonging to the user is present where the user was waiting for the autonomous vehicle;

cause an alert to be raised with respect to the item belonging to the user; and keep the autonomous vehicle from departing until the alert has been resolved.

11. The device of claim 10, wherein the information from the autonomous vehicle comprises at least one of a vehicle identification number (VIN), a ride identification number, a location of the autonomous vehicle, or external camera images.

12. The device of claim 10, wherein the information from the user device comprises at least one of a photo image from the user device, a Radio Frequency ID (RFID) tag identifier, or a control state of an application running on the user device.

13. The device of claim 10, wherein the information from the responsible party device comprises at least one of instructions for the autonomous vehicle, the user device, or the user of the user device, an authentication code, a password, or a device identifier for the user device.

14. The device of claim 10, wherein the one or more processors are configured to receive environmental information comprising at least one of a camera image from a surveillance camera, data from a venue at, which the autonomous vehicle is to pick up the user, a camera image from another autonomous vehicle, telemetry from another autonomous vehicle, a smart highway sensor value, or a smart highway actuator or signal state.

15. The device of claim 10, wherein the one or more processors are configured to verify by processing multiple factors from each of the user device, the responsible party device, and the autonomous vehicle.

16. A non-transitory tangible computer readable storage media encoded with instructions that, when executed by at least one processor, is configured to cause the processor to:

receive information from an autonomous vehicle;

receive information from a user device;

receive information from a responsible party device, which is different from the user device;

process the information from the autonomous vehicle, the information from the user device, and the information from the responsible party device;

based on a process result of the information from the autonomous vehicle, the information from the user device, and the information from the responsible party device, verify that the autonomous vehicle is matched with a user of the user device, wherein the user of the user device is an intended passenger for the autonomous vehicle;

using an external camera on the autonomous vehicle, and upon the user embarking on the autonomous vehicle, detect whether an item belonging to the user is present where the user was waiting for the autonomous vehicle;

cause an alert to be raised with respect to the item belonging to the user; and keep the autonomous vehicle from departing until the alert has been resolved.

17. The computer readable storage media of claim 16, further comprising instructions to cause the processor to:

verify by processing multiple factors from each of the user device, the responsible party device, and the autonomous vehicle.

* * * * *

UNITED STATES PATENT AND TRADEMARK OFFICE
CERTIFICATE OF CORRECTION

PATENT NO. : 10,628,641 B2
APPLICATION NO. : 15/489857
DATED : April 21, 2020
INVENTOR(S) : Monica Shen Knotts

Page 1 of 1

It is certified that error appears in the above-identified patent and that said Letters Patent is hereby corrected as shown below:

In the Claims

Claim 14, Column 15, Line 27, replace "venue at, which" with --venue at which--

Signed and Sealed this
Seventh Day of July, 2020

Andrei Iancu
*Director of the United States Patent and Trademark Office*